US011290276B2

(12) United States Patent
Perlman et al.

(10) Patent No.: US 11,290,276 B2
(45) Date of Patent: Mar. 29, 2022

(54) METHOD AND SYSTEM FOR A SIGNED DOCUMENT VALIDITY SERVICE

(71) Applicant: EMC IP Holding Company LLC, Hopkinton, MA (US)

(72) Inventors: Radia Joy Perlman, Redmond, WA (US); Charles William Kaufman, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 237 days.

(21) Appl. No.: 16/530,962

(22) Filed: Aug. 2, 2019

(65) Prior Publication Data

US 2021/0036853 A1    Feb. 4, 2021

(51) Int. Cl.
*H04L 9/32*    (2006.01)

(52) U.S. Cl.
CPC ............ *H04L 9/321* (2013.01); *H04L 9/3236* (2013.01); *H04L 9/3247* (2013.01); *H04L 9/3268* (2013.01); *H04L 9/3265* (2013.01)

(58) Field of Classification Search
CPC ..... H04L 9/321; H04L 9/3236; H04L 9/3268; H04L 9/3247; H04L 9/3265; H04L 63/00; H04L 2463/101; H04L 63/123
See application file for complete search history.

(56) References Cited

U.S. PATENT DOCUMENTS

| 8,914,639 | B2 * | 12/2014 | Hogan | H04L 9/3247 713/176 |
| 8,954,731 | B2 * | 2/2015 | Tenenboym | H04L 63/0823 713/156 |
| 9,009,477 | B2 * | 4/2015 | Das | H04L 9/3268 713/168 |
| 9,276,749 | B2 * | 3/2016 | Tenenboym | H04L 63/0876 |
| 9,768,965 | B2 * | 9/2017 | Tenenboym | G06F 21/78 |
| 10,216,921 | B1 * | 2/2019 | Janse Van Rensburg | H04L 67/1002 |
| 10,523,526 | B2 | 12/2019 | Dementev et al. | |
| 2019/0108482 | A1 | 4/2019 | Vikas et al. | |
| 2020/0387585 | A1 | 12/2020 | Martinez et al. | |

\* cited by examiner

*Primary Examiner* — Christopher A Revak

(74) *Attorney, Agent, or Firm* — Chamberlain, Hrdlicka, White, Williams & Aughtry

(57) ABSTRACT

A method for managing documents includes obtaining, from a first computing device, a first signed document, and in response to obtaining the first signed document: identifying a first plurality of validity services associated with the signed document, sending a verification request to the first plurality of validity services, wherein each of the plurality of verification requests specifies the first signed document, obtaining a plurality of verification responses from the first plurality of validity services, and making a determination, based on the plurality of verification responses, that the first signed document is valid.

20 Claims, 11 Drawing Sheets

METHOD AND SYSTEM FOR A SIGNED DOCUMENT VALIDITY SERVICE

BACKGROUND

Electronic documents may be digitally signed by, e.g., an owner of the electronic document. Once signed a third-party can use the digital signature to verify that the electronic document they received is in-fact the electronic document that was signed by the owner. Traditionally, once signed, the digital signature associated with the electronic document persists through the life of the electronic document.

SUMMARY

In general, in one aspect, the invention relates to a method for managing documents. The method includes obtaining, from a first computing device, a first signed document, and in response to obtaining the first signed document: identifying a first plurality of validity services associated with the signed document, sending a verification request to the first plurality of validity services, wherein each of the plurality of verification requests specifies the first signed document, obtaining a plurality of verification responses from the first plurality of validity services, and making a determination, based on the plurality of verification responses, that the first signed document is valid.

In general, in one aspect, the invention relates to a method for managing documents. The method includes obtaining a target document, generating, using a certificate, a signature based on the target document and a verification policy, and obtaining a signed document using the signature, the target document, and the verification policy.

In general, in one aspect, the invention relates to a non-transitory computer readable medium which includes computer readable program code, which when executed by a computer processor enables the computer processor to perform a method for managing documents. The method includes obtaining, from a first computing device, a first signed document, and in response to obtaining the first signed document: identifying a first plurality of validity services associated with the signed document, sending a verification request to the first plurality of validity services, wherein each of the plurality of verification requests specifies the first signed document, obtaining a plurality of verification responses from the first plurality of validity services, and making a determination, based on the plurality of verification responses, that the first signed document is invalid.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing signed documents. Specifically, embodiments of the invention relate to a method for revoking the signed documents and verifying that a signed document has been revoked. Embodiments of the invention include generating a signed document with a signature and using one or more validity services to track the validity of the signed documents.

Embodiments of the invention may further include a maintenance service that stores the signed document and a revocation status of the signed document. The signed document may be accessed by a user of the computing device that generated the signed document to determine whether a signed document should be revoked.

Figure 1A:
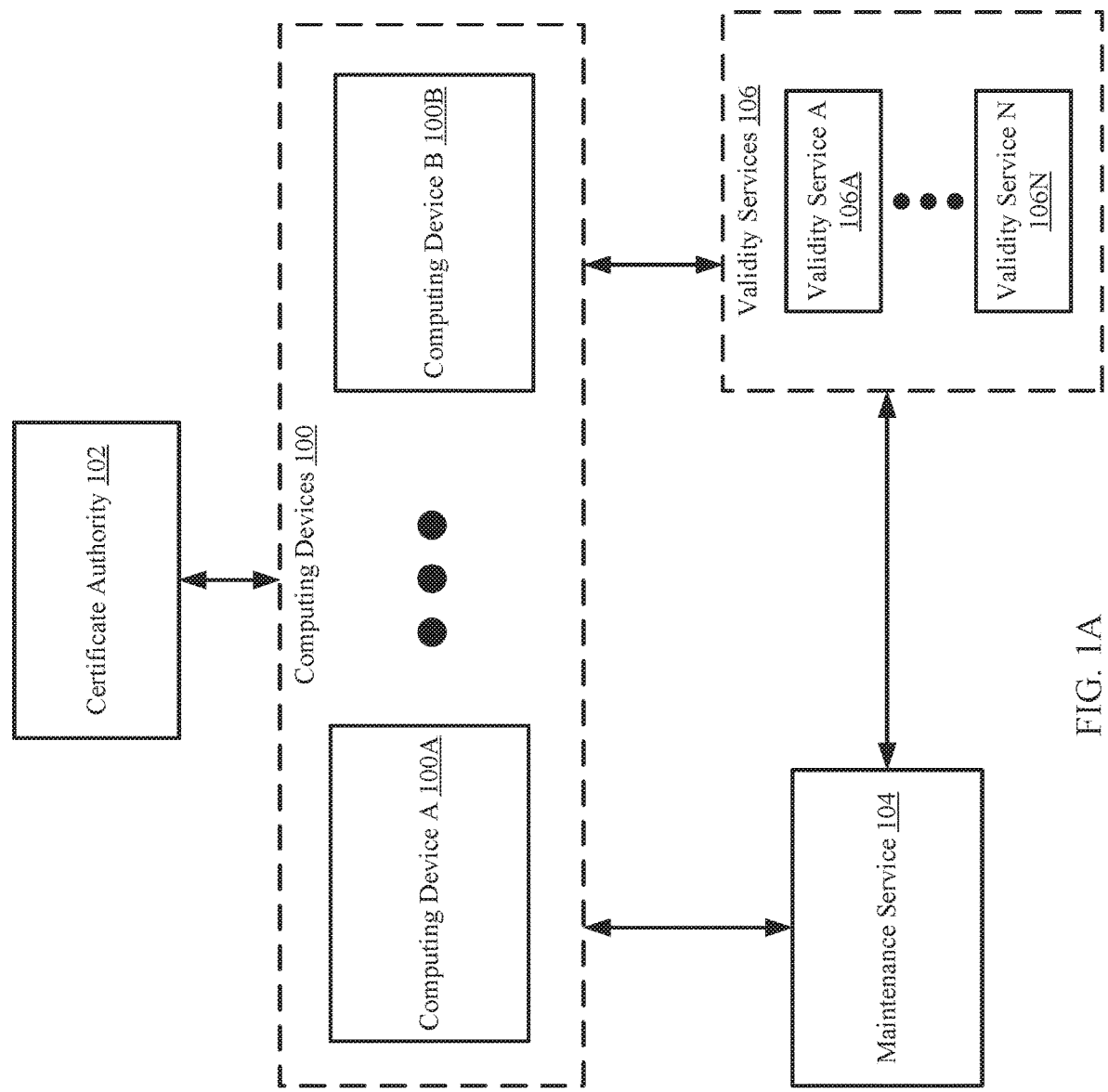
FIG. 1A shows a diagram of a system in accordance with one or more embodiments of the invention.

FIG. 1A shows a diagram of a system in accordance with one or more embodiments of the invention. The system includes at least two computing devices (100), at least one certificate authority (102), one or more validity services (106), and a maintenance system (104). Each component of the system may be operably connected via any combination of wired and/or wireless connections. Each component of the system illustrated in FIG. 1A is discussed below.

In one or more embodiments of the invention, the computing devices (100) transfer data between each other. The data may be, for example, signed documents. In one or more embodiments of the invention, computing device A (100A)

includes functionality for generating a target document and additional functionality for generating a signature for the document.

In one or more embodiments of the invention, the computing device (e.g., 100A) that generates the signed document also includes functionality to update the validity services (106) to confirm validity of the signed document and/or to revoke the validity of the signed document. The computing device (100A) may revoke the validity of the signed document after a user of the computing device (100A) determines that the signed document is no longer valid. For additional details regarding a signed document, see, e.g., FIG. 1C.

Figure 4:
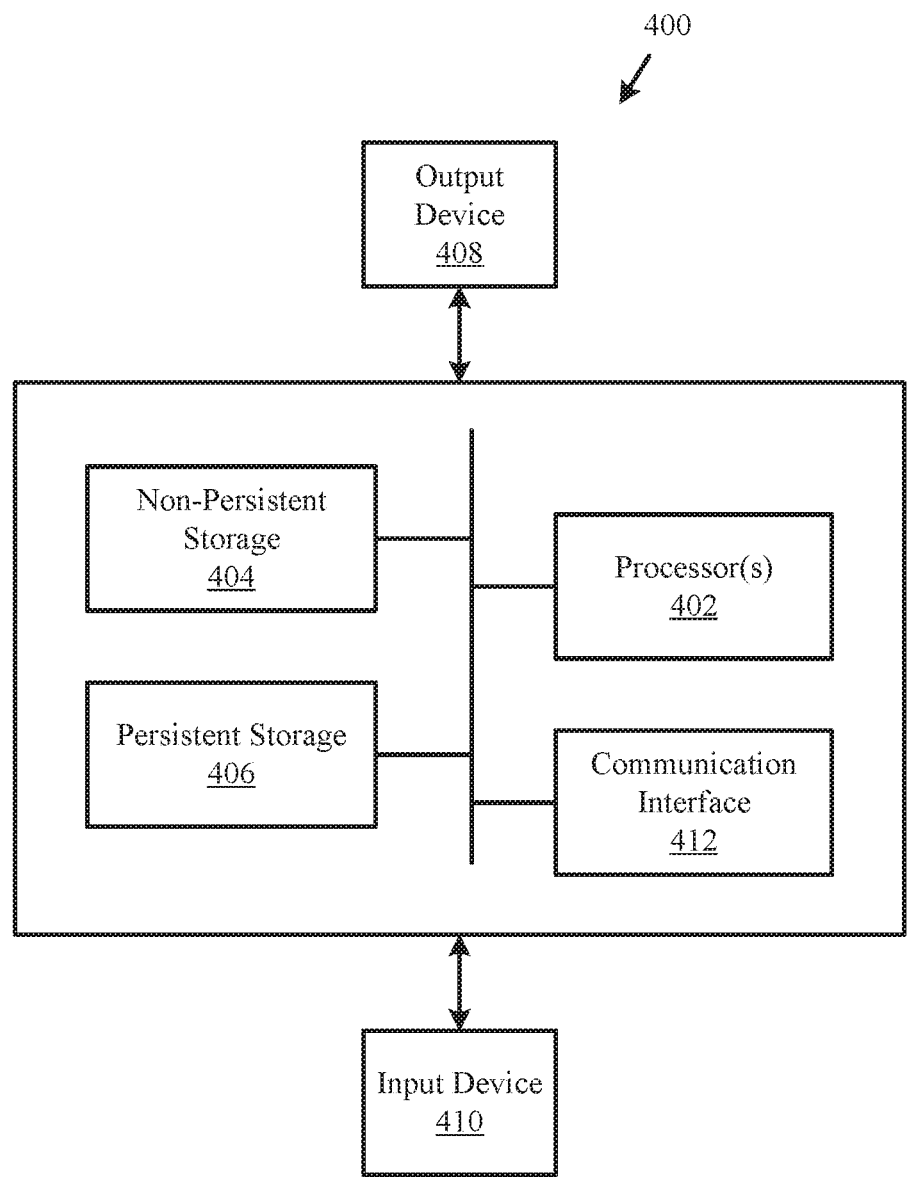
FIG. 4 shows a diagram of a computing device in accordance with one or more embodiments of the invention.

In one or more embodiments of the invention, each computing device (100A, 100B) is implemented as a computing device shown in FIG. 4. A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the computing device (100A, 100B) described throughout this application and/or all, or a portion thereof, of the methods illustrated in FIGS. 2A-2D.

A computing device (100A, 100B) may be implemented as a logical device without departing from the invention. The logical device utilizes computing resources of any number of physical computing devices to provide the functionality of the computing device (100A, 100B) described throughout this application and/or all, or a portion thereof, of the methods illustrated in FIGS. 2A-2D.

In one or more embodiments of the invention, the certificate authority (102) is a trusted entity that generates and issues certificates to be used for transferring signed documents between the computing devices (100). The certificate authority (102) may store a repository of certificates to be obtained by the computing devices (100) when verifying that an obtained signed document is obtained from an intended sender.

In one or more embodiments of the invention, the certificate authority (102) is implemented as a computing device (see e.g., FIG. 4). The computing device may be, for example, a mobile phone, tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the certificate authority (102) described throughout this application.

The certificate authority (102) may be implemented as a logical device without departing from the invention. The logical device utilizes computing resources of any number of physical computing devices to provide the functionality of the certificate authority (102) described throughout this application.

In one or more embodiments of the invention, the validity services (106) store validity information about signed documents. The validity information may be used to determine whether a signed document has been s revoked. In this context, a signed document is deemed to be revoke when a user determines that the electronic signature is no longer valid, the user determines that it wants to undo (or no longer sign) the signed document, and/or any other reason that the user determines that the signed document should be no longer be viewed/understood by others that the signature on the document is valid. The computing devices (100) may communicate with the validity services (106) by sending notifications to verify and/or revoke a generated signed document. Further, a computing device (e.g., 100B) may communicate with the validity services (106) by requesting a subset of the validity services (106) to determine a validity of an obtained signed document. The validity services (106) may use the validity information to make the determination and send a response to the requesting computing device (100B).

In one or more embodiments of the invention, the validity information of a validity service is implemented as a (or using a) valid list. In one or more embodiments of the invention, a valid list is a data structure that specifies documents that are valid. When a validity service (106A, 106N) implements a valid list, the validity service (106A, 106N) may make the determination that a signed document is valid by identifying, e.g., using a document identifier, that the signed document is specified in the valid list.

In one or more embodiments of the invention, the validity information of a validity service is implemented a (or using a) revoked list. In one or more embodiments of the invention, a revoked list is a data structure that specifies documents that are not valid. When a validity service (106A, 106N) implements a revoked list, the validity service (106A, 106N) may make the determination that a signed document is valid by identifying e.g., using a document identifier, that the signed document is not specified in the revoked list. Each of the validity services may implement any combination of valid lists and/or revoked lists without departing from the invention.

In one or more embodiments of the invention, each validity service (106A, 106N) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the validity service (106A, 106N) described throughout this application.

Each validity service (106A, 106N) may be implemented as a logical device without departing from the invention. The logical device utilizes computing resources of any number of physical computing devices to provide the functionality of the validity service (106A, 106N) described throughout this application.

In one or more embodiments of the invention, the maintenance service (104) maintains signed documents and the validity of the signed documents. The signed documents stored in the maintenance service (104) may be accessed by a computing device (100A, 100B) that generates the signed documents. In this manner, a user of a computing device (100A, 100B) may track previously-signed documents and also track whether a signed document is valid (i.e., the user or legal entity that signed the document has not revoked its signature).

In one or more embodiments of the invention, the maintenance service (104)) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the maintenance service (104) described throughout this application.

The maintenance service (104) may be implemented as a logical device without departing from the invention. The logical device utilizes computing resources of any number of physical computing devices to provide the functionality of the maintenance service (104) described throughout this application.

In one or more of embodiments of the invention, the maintenance service (104) is implemented as computer instructions, e.g., computer code, stored on a persistent storage of computing device A (100A) that when executed by a processor of the computing device (100A) cause the computing device (100A) to provide the aforementioned functionality of the maintenance service (100A) described throughout this application.

While FIG. 1A shows an embodiment of the architecture of the system, the invention is not limited to the architecture shown in FIG. 1A. For example, the various embodiments of the invention may not implement a maintenance service.

Figure 1B:
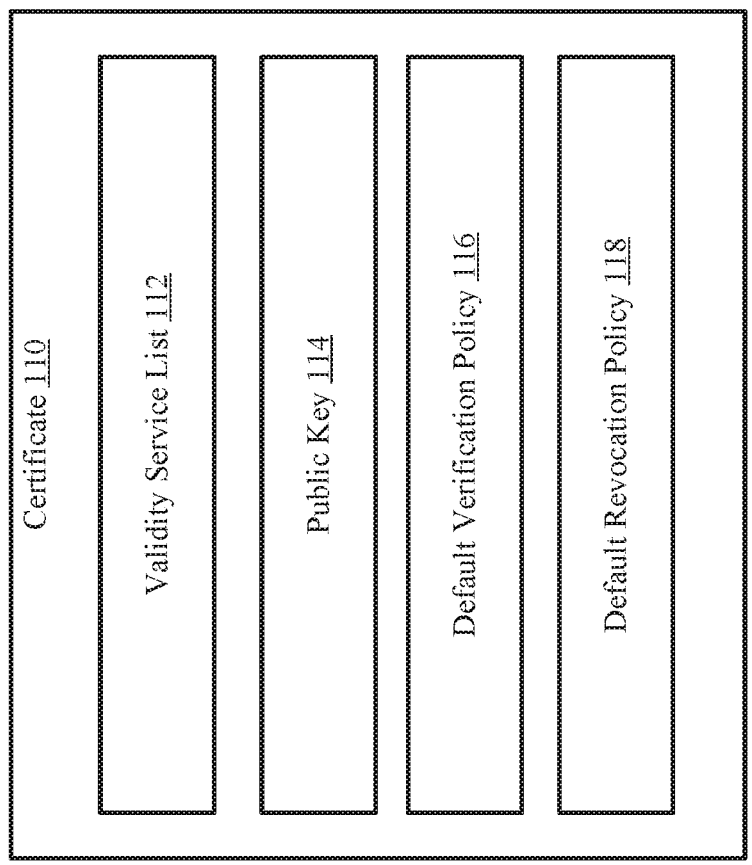
FIG. 1B shows a diagram of a certificate in accordance with one or more embodiments of the invention.

FIG. 1B shows a diagram of a certificate in accordance with one or more embodiments of the invention. As discussed above, the certificate (110) may be generated by a certificate authority. The certificate (110) may include a validity service list (112), a public key (114), a default verification policy (116), and a default revocation policy (118). The certificate (110) may include additional, fewer, and/or different data structures without departing from the invention. Each of the aforementioned data structures is discussed below.

In one or more embodiments of the invention, the validity service list (112) is a data structure that specifies a list of validity services that may be used to verify a signed document associated with the certificate (110). The validity service list (112) may include a validity service identifier for each validity service of the validity service list (112). A validity service identifier may be, for example, a string of numbers, letters, symbols, or any combination thereof that uniquely identifies the validity service. Examples of validity service identifiers may include, but are not limited to, universal resource identifiers (URIs), universal resource locators (URLs), Internet Protocol Addresses, etc.

In one or more embodiments of the invention, the public key (114) is part of a public-private key pair that is used to verify a signature. The public key (114) may be obtained by a computing device to verify a signature of an obtained signed document. For example, the signature may be verified by performing a decryption of the signature. The decryption may be used by the computing device as part of the process to verify that the signed document was sent by a known sender (e.g., a second computing device). The signature may be verified via other methods without departing from the invention.

In one or more embodiments of the invention, the default verification policy (116) is a data structure that specifies a verification policy to be performed by a computing device that receives a signed document. The default verification policy (116) may be performed if the signed document does not specify a verification policy.

In one or more embodiments of the invention, a verification policy is a policy that specifies a process for verifying a validity of a signed document. In one or more embodiments of the invention, the process includes sending a document identifier of the signed document to at least a subset of the validity service list (112) and obtaining a response from each validity service. The process may further include determining, based on the responses, whether the signed document is valid.

In one or more embodiments of the invention, a verification policy specifies a condition. The condition may be, for example, that a computing device may determine that the signed document (120) is valid if a minimum number of a specified subset of validity services determine that the signed document (120) is valid. For example, at least three validity services need to respond and indicate that the signed document is valid.

Further, the condition of the verification policy may specify that a computing device determines that the signed document (120) is valid if the signed document (120) is obtained during a predetermine time period after a document is signed. In this manner, the verification policy (126) addresses a case in which there is a delay between a point in time in which the validity services of the verification policies obtain verification that the signed document (120) is valid and a point in time in which the computing device requests verification from the validity services.

In one or more embodiments of the invention, a default revocation policy (118) is a data structure that specifies a revocation process to be performed should a computing device determine that a signed document is no longer valid. The default revocation policy (118) may be performed by the computing device making the determination.

In one or more embodiments of the invention, a revocation policy is a policy that specifies a process for revoking a signed document. For example, the process may specify one or more validity services to which a revocation request is to be sent. The validity services specified in the default revocation policy (118) may be a subset of the validity service list (112).

In one or more embodiments of the invention, the certificate (110) is stored in a standard format that is recognized by the entities specified in FIG. 1A. The format may be, for example, X.509. The format of the certificate (110) may be in another format without departing from the invention.

Figure 1C:
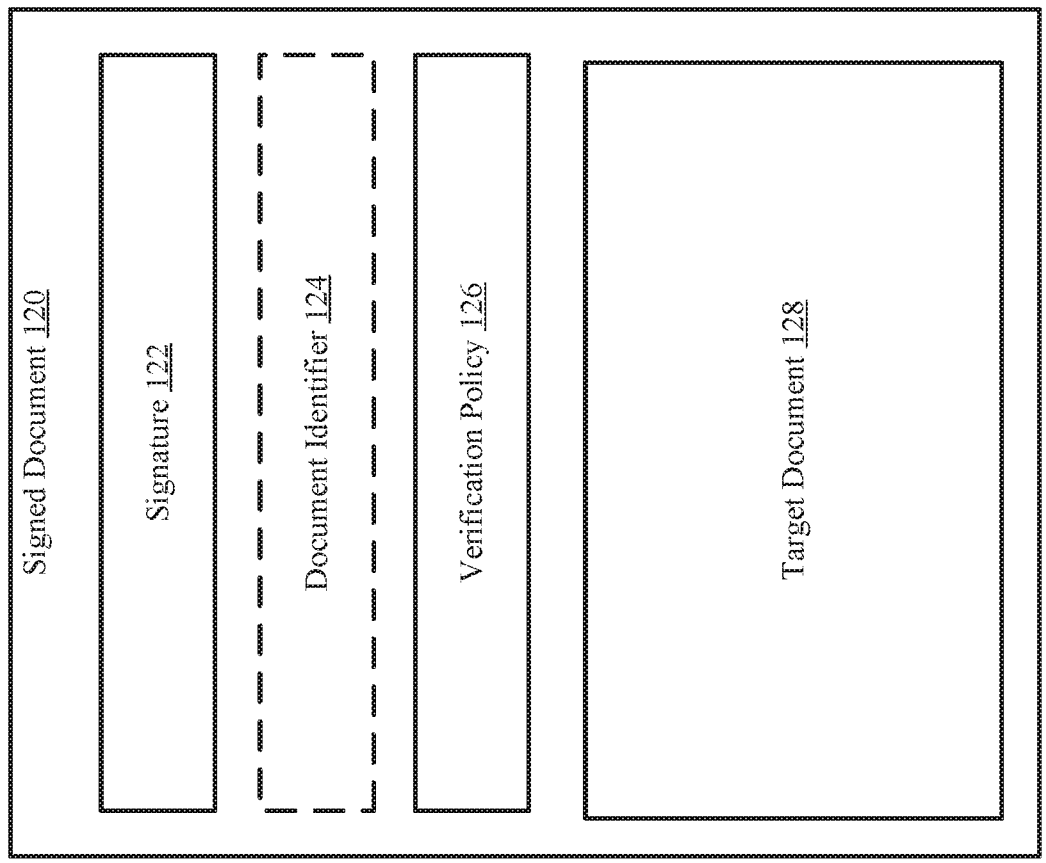
FIG. 1C shows a diagram of a signed document in accordance with one or more embodiments of the invention.

FIG. 1C shows a diagram of a signed document in accordance with one or more embodiments of the invention. The signed document (120) may include a signature (122), (optionally) a document identifier (124), a verification policy (126), and a target document (128). The signed document (120) may include additional, fewer, and/or different portions without departing from the invention. Each of the aforementioned portions of the signed document (120) is discussed below.

In one or more embodiments of the invention, the signature (122) is a data structure generated using a private key of a computing device generating the signed document (120). The signature may be generated by processing data using the private key. The data may be, for example, the target document (128) and the verification policy (126). The process may include applying a hash function on the data to obtain a hash value and then encrypting the hash value using the private key to obtain the signature (122). In one or more embodiments of the invention, encryption refers to applying an algorithm to a data set using and the private key to generate a unique string of numbers, characters or any combination thereof that can only be replicated by performing the same algorithm on the same data using the corresponding public key.

In one or more embodiments of the invention, the signed document (120) includes a document identifier (124). In one or more embodiments of the invention, the document identifier (124) is a data structure that uniquely specifies the signed document. Examples of the document identifier may include a hash value of the target document (128), a hash value of the signature (122), or a random string of numbers, letters, symbols, or any combination thereof that uniquely identifies the signed document (120).

In one or more embodiments of the invention, the document identifier (124) is the signature (122). In such embodiments, there is not a separate document identifier (124), as the signature (122) would also serve the purpose of the document identifier (124).

In one or more embodiments of the invention, the verification policy (126) is a data structure that specifies a verification policy to be implemented on a signed document by a second computing device when verifying the validity of the signed document (120). As discussed above, the verification policy specifies sending the document identifier (124) (which may be the signature (122)) to one or more validity services and obtaining a validity response from each validity service that specifies whether the signed document is valid. The verification policy (126) may further specify to determine the validity of the signed document based on the obtained validity responses.

For example, a verification policy (126) may specify that the signed document is to be verified by validity services V1, V2, V3, V4, and V5. Further, the verification policy may specify that the document is valid if at least three of the five validity services (V1, V2, V3, V4, V5) determine that the signed document is valid.

In one or more embodiments of the invention, the signed document (120) includes a target document (128). In one or more embodiments of the invention, the target document (128) is a document that is intended to be sent to a second computing device. The target document (128) may include data intended to be accessed only by the second computing device. The data of the target document (128) may be any type of data without departing from the invention.

FIGS. 2A-2D show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2D may be performed in parallel with any other steps shown in FIGS. 2A-2D without departing from the scope of the invention.

Figure 2A:
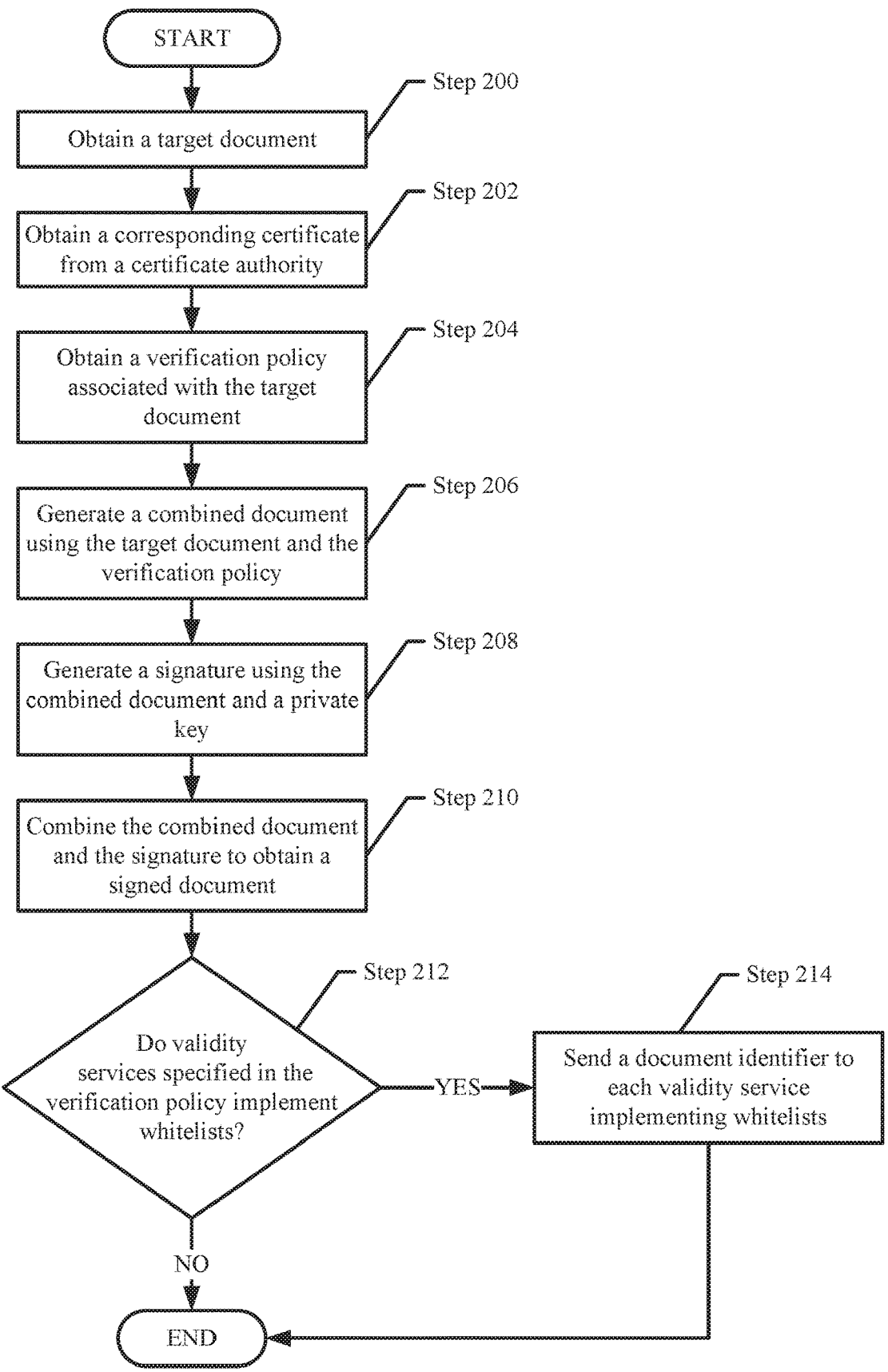
FIG. 2A shows a flowchart for generating a signed document in accordance with one or more embodiments of the invention.

FIG. 2A shows a flowchart for generating a signed document in accordance with one or more embodiments of the invention. The method shown in FIG. 2A may be performed by, for example, a first computing device (100A, FIG. 1A). Other components of the system illustrated in FIG. 1A may perform the method of FIG. 2A without departing from the invention.

Turning to FIG. 2A, in step 200, a target document is obtained. In one or more embodiments of the invention, the target document is generated by the first computing device. The target document may be obtained by generating the data associated with the target document and storing the data as the target document.

In step 202, a corresponding certificate is obtained from a certificate authority. In one or more embodiments of the invention, the certificate is obtained by sending a request to the certificate authority that specifies the user or another legal entity that is going to be signing the target document. The certificate authority may search a repository of certificates to identify the certificate associated with the user or legal entity and then send the identified certificate back to the computing device that requested the certificate. Step 202 may be skipped or omitted if the appropriate certificate is already present on the computing device.

In step 204, a verification policy associated with the target document is obtained. In one or more embodiments of the invention, the verification policy is determined by identifying a subset of validity services specified in the validity service list of the obtained certificate and specifying a minimum number of the subset of validity services that are to be used to verify the validity of the signed document (generated in step 210). Further, the verification policy may specify a time period after signing the target document in which the second computing device may automatically determine the document to be valid.

In one or more embodiments of the invention, the verification policy is obtained by using a default verification policy specified by the certificate. The default verification policy may be copied and used as the verification policy stored with the target document.

In step 206, a combined document is generated using the target document and the verification policy. In one or more embodiments of the invention, the combined document includes the target document and the verification policy.

In step 208, a signature is generated using the combined document and a private key. In one or more embodiments of the invention, the signature is generated by applying a hash function, or other function without departing from the invention, to generate a hash value, and encrypting the hash value using the private key (which is part of the public-private key pair of which the public key in the certificate is a member) to generate the signature. The private key may be stored on the computing device (or in another location accessible by the computing device)

In step 210, the combined document is combined with the signature to obtain a signed document. In one or more embodiments of the invention, the signed document includes the combined document (i.e., the target document and the verification policy) and the signature.

In one or more embodiments of the invention, the signed document further comprises a document identifier. The document identifier may be generated by applying a hash function on the target document, a hash function on the signature, a hash function on the combined document, a random number, and/or any other method for generating an identifier without departing from the invention. Alternatively, the signature may be specified as the document identifier without departing from the invention.

In step 212, a determination is made about whether any validity services specified in the verification policy implement a valid list. If any of the validity services specified in the verification policy implements a valid list, the method proceeds to step 214; otherwise, the method ends following step 212.

In step 214, a document identifier of the signed document is sent to each validity service specified in the verification policy that implements a valid list. In one or more embodiments of the invention, the document identifier sent to the validity service(s) is the document identifier generated in step 210. Alternatively, the document identifier sent to the validity service(s) is the signature generated in step 208.

In one or more embodiments of the invention, the signed document is sent to the validity services in a batch of signed documents. In this manner, the computing device may communicate with the validity services less frequently than the frequency that the computing device generates signed documents.

In one or more embodiments of the invention, the signed document is further sent to a maintenance service. The maintenance service may store the signed document in a manner that allows the computing device to access and identify other signed documents stored in the maintenance service. A user (or legal entity) may access the signed documents of the maintenance service to determine what documents it has signed.

Figure 2B:
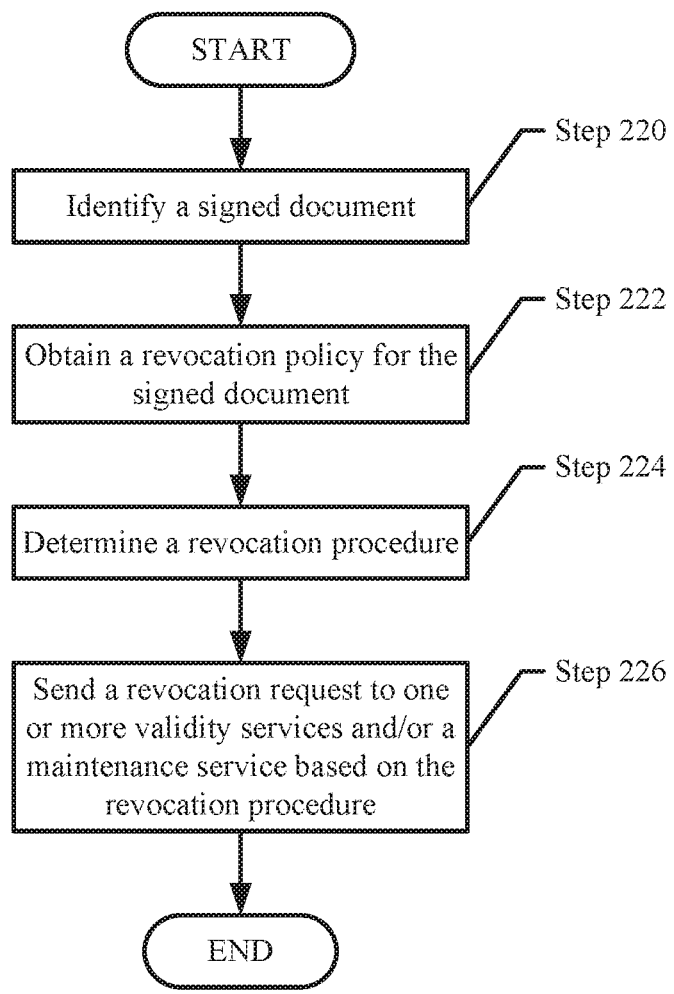
FIG. 2B shows a flowchart for revoking a signed document in accordance with one or more embodiments of the invention.

FIG. 2B shows a flowchart for revoking a signed document in accordance with one or more embodiments of the invention. The method shown in FIG. 2B may be performed by, for example, a first computing device (100A, FIG. 1A). Other components of the system illustrated in FIG. 1A may perform the method of FIG. 2B without departing from the invention.

In step 220, a signed document is identified. In one or more embodiments of the invention, the signed document is identified using a maintenance service. A user of the first computing device may access the maintenance service to access signed documents stored in the maintenance service.

In one or more embodiments of the invention, the user determines that the signed document is invalid and should be specified as such in the maintenance service and one or more validity services. The determination may be made based on information obtained by the user.

The information may include, for example, knowledge that a malicious entity has obtained access to a private key used to sign the signed document and may potentially sign documents using the private key. In another example, the user may determine that it wants to revoke its signature from a previously signed document.

In step 222, a revocation policy associated with the signed document is obtained. In one embodiment of the invention, the computing device may obtain a certificate for the user or legal entity that specifies a default revocation policy. The certificate may be obtained from the certificate authority. The first computing device may identify the default verification policy as the identified verification policy. Alternatively, there may be a specific revocation policy associated with the document that may be located on or otherwise accessible to the computing device that is perform the method in FIG. 2B.

In step 224, a revocation procedure is determined based on the revocation policy. In one or more embodiments of the invention, a revocation procedure is a specified process for which to revoke the signed document. The revocation procedure may specify at least one validity service to which to send a revocation request specifying revoking the signed document.

In one or more embodiments of the invention, the revocation procedure is specified in a default revocation policy of a certificate associated with the signed document. The default revocation policy may be obtained from the certificate.

In step 226, a revocation request is sent to one or more validity services and/or a maintenance service based on the revocation procedure. In one or more embodiments of the invention, the revocation request(s) are sent to the validity service(s) specified in the revocation procedure. As discussed above, the revocation requests may specify revoking the signed document to be identified as invalid.

In one or more embodiments of the invention, a revocation request sent to a maintenance service may be used by the maintenance service to update a revocation status of the signed document stored in the maintenance service. For example, the maintenance service may set the signed document to "invalid." In this manner, a user accessing the maintenance service may verify that the signed document has been revoked as requested.

Figure 2C:
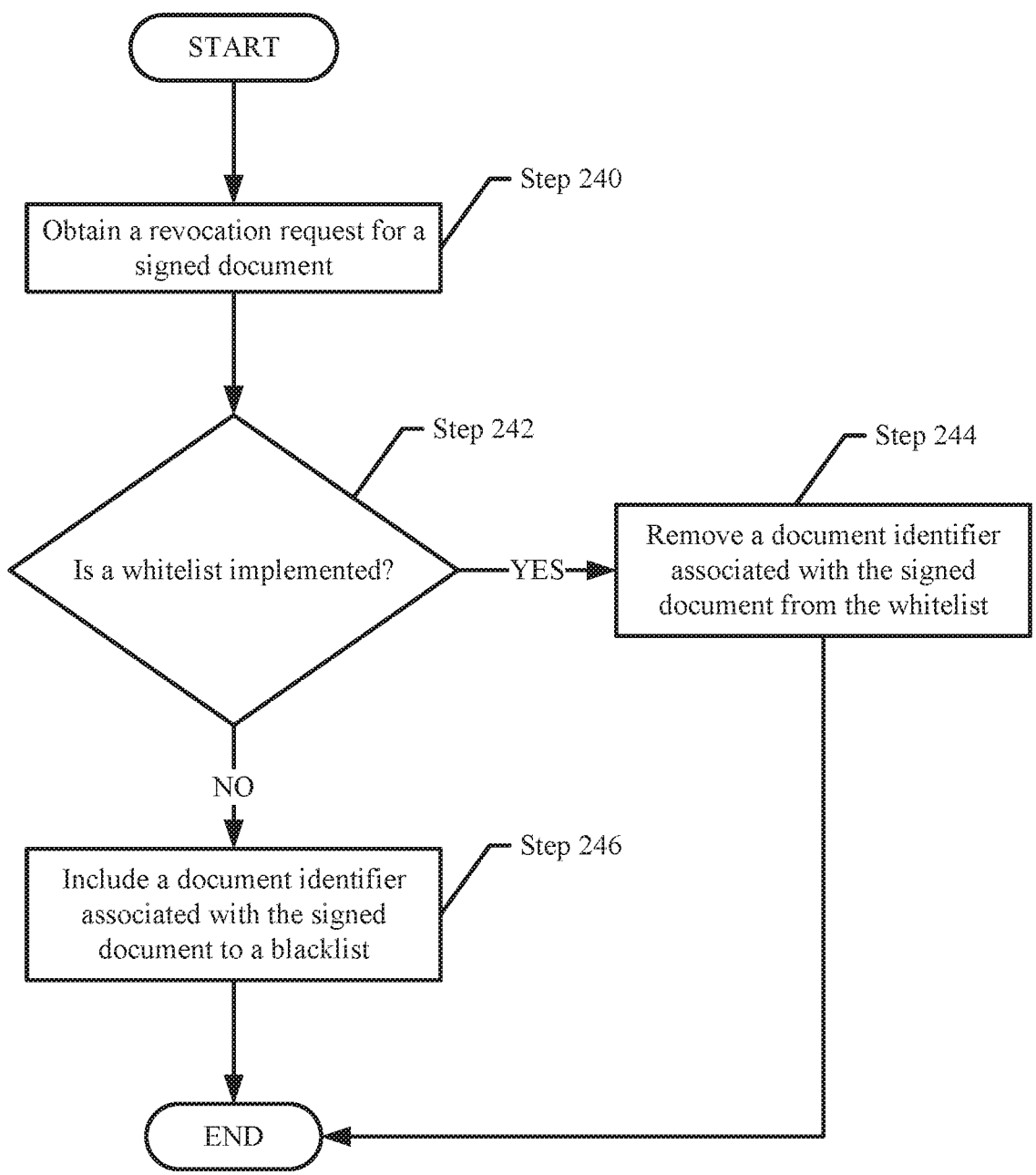
FIG. 2C shows a updating a validity service in accordance with one or more embodiments of the invention.

FIG. 2C shows a updating a validity service in accordance with one or more embodiments of the invention. The method shown in FIG. 2C may be performed by, for example, a validity service (106A, 106N, FIG. 1A). Other components of the system illustrated in FIG. 1A may perform the method of FIG. 2C without departing from the invention.

In step 240, a revocation request is obtained for a signed document. In one or more embodiments of the invention, the revocation request may specify revoking the signed document. The revocation request may include, for example, a document identifier of the signed document.

In step 242, a determination is made about whether the validity service implements a valid list. If the validity service implements a valid list, the method proceeds to step 244; otherwise, the method proceeds to step 246.

In step 244, a document identifier associated with the signed document is removed from the valid list. In this manner, the signed document is no longer valid. Further, if a future computing device sends a verification request to the validity service to verify the validity of the signed document, the validity service may use the updated valid list to determine the validity of the signed document.

In step 246, a document identifier associated with the signed document is included to a revoked list. In this manner, the signed document is no longer valid. Further, if a future computing device sends a verification request to the validity service to verify the validity of the signed document, the validity service may use the updated revoked list to determine the validity of the signed document.

Figure 2D:
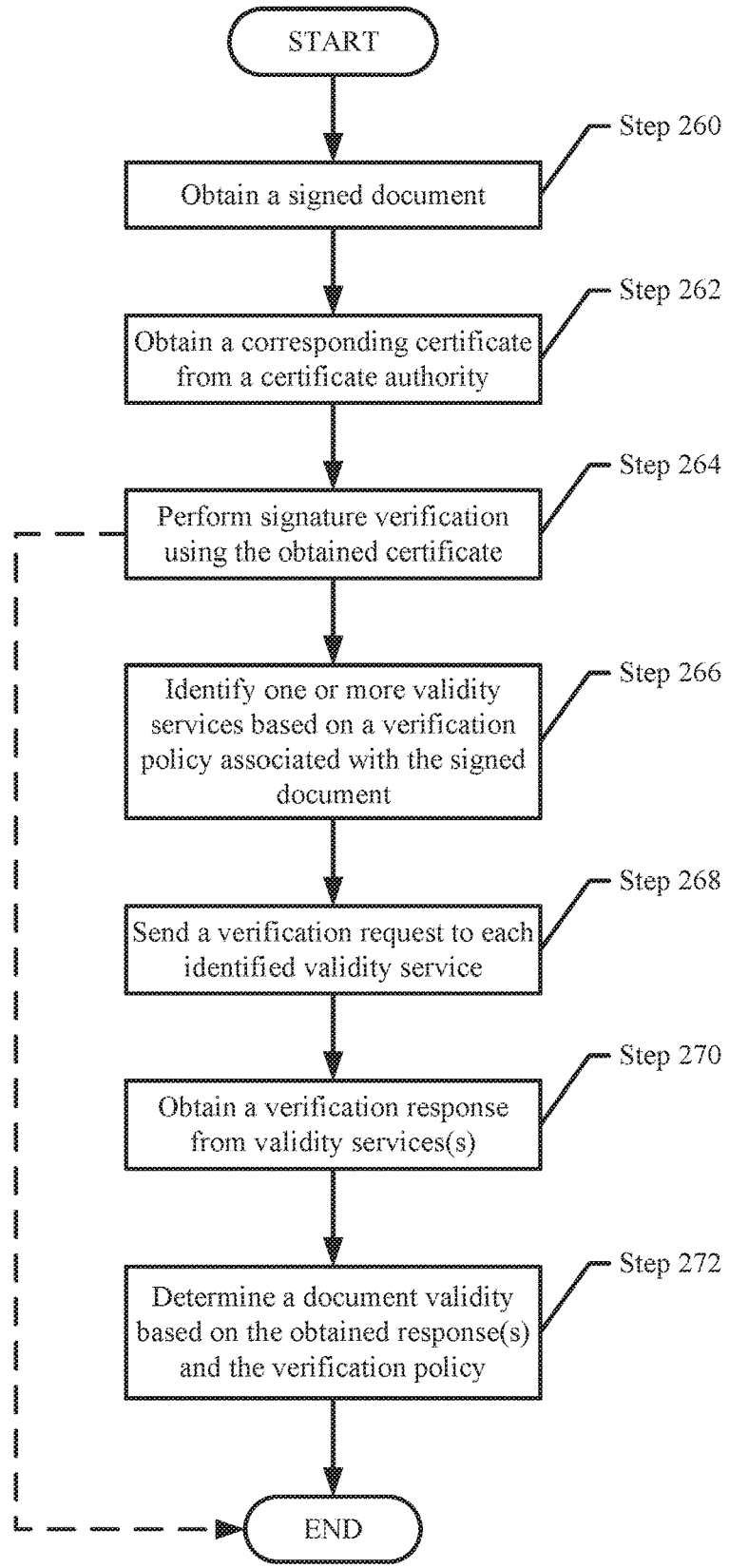
FIG. 2D shows a flowchart for performing a document verification on a signed document in accordance with one or more embodiments of the invention.

FIG. 2D shows a flowchart for performing a document verification on a signed document in accordance with one or more embodiments of the invention. The method shown in FIG. 2B may be performed by, for example, a second computing device (100B, FIG. 1A). Other components of the system illustrated in FIG. 1A may perform the method of FIG. 2D without departing from the invention.

In step 260, a signed document is obtained. In one or more embodiments of the invention, the signed document is obtained from a computing device of FIG. 1A that generated the signed document. The first computing device may also be referred to as the intended sender.

In step 262, a corresponding certificate is obtained from a certificate authority. In one or more embodiments of the invention, the second computing device obtains the certificate by sending a request to the certificate authority to obtain the certificate associated with the signed document and obtaining a response that includes the certificate. The certificate authority may search a repository of certificates to identify the certificate associated with the user or legal entity that signed the document (i.e., the signed document obtained in step 260). Step 262 may not be performed if the appropriate certificate is already present on the second computing device.

In step 264, a signature verification is performed using the obtained certificate. In one or more embodiments of the invention, the signature verification includes decrypting the signature of the signed document using a public key obtained from the certificate. The result of the decryption may be a hash value of a combined document. The combined document may include a target document and a verification policy of the signed document.

The signature verification may further include performing a hash function of the combined document obtained from the signed document to generate a second hash value. The second hash value may be compared to the first hash value obtained from decrypting the signature. If the two hash values match, the second computing device may confirm that the signed document was obtained from the intended sender. The second computing device may further confirm that the data of the target document and the verification policy were not altered or modified between the time it was signed by user (or legal entity) and the time it was received by the second computing device.

For example, if the two hash values do not match, the method may end following step 264, as this results in the second computing device not confirming that the signed document was obtained from the intended sender. In this manner, the second computing device does not attempt to further verify the validity of the signed document if it cannot confirm that the signed document was obtained from the intended sender.

In one or more embodiments of the invention, the invention is not limited to the aforementioned method of signature verification; rather, any method of signature verification may be used without departing from the invention.

In step 266, one or more validity services are identified based on a verification policy associated with the signed document. In one or more embodiments of the invention, the verification policy is specified in the signed document. The second computing device may analyze the verification policy to identify the validity services.

In one or more embodiments of the invention, the signed document does not include a verification policy. In such a scenario, the second computing device may identify the validity services from a default verification policy specified in the certificate (i.e., the certificate associated with the sign document, see e.g., Step 262). The second computing device may analyze the default verification policy to identify the validity services.

In step 268, a verification request is sent to each identified validity service. In one or more embodiments of the invention, the verification request includes a document identifier associated with the signed document. The second computing device may obtain the document identifier from the signed document and use the document identifier to generate the verification request.

In one or more embodiments of the invention, the signature of the signed document serves as the document identifier. In such embodiments, the verification request specifies the signature of the signed document.

In step 270, a verification response is obtained from one or more of the validity services. In one or more embodiments of the invention, the verification response of a validity service may specify a validity of the signed document (i.e., whether the signed document is valid or invalid) based on the validity service.

In various scenarios, one or more validity services may be inaccessible, offline, or otherwise unreachable. In these scenarios, a verification response may not be received from all of the validity service to which a verification request was sent. Further, the contents of the validity services may not be consistent. For example, two the validity services are implementing a valid list, the contents of each of the valid list may not be consistent as a result of a latency related to the updating of the valid lists. As a result, one valid list may include a document identifier while another valid list may not. In these scenarios (as well as other similar scenarios), each of the validity services may generate a verification response that is different. One verification response may indicate that the signed document is valid while the other verification response may indicate that the signed document is invalid.

To address the above scenario, the verification policy may rely on receiving a minimum number of verification responses (i.e., a quorum) prior to making a validation determination in step 272. In another embodiment (as described in further detail below), a sign document may only be deemed to be valid if a minimum number of verification responses are received that specify that the signed document is valid.

In step 272, a document validity is determined based on the obtained verification responses and the verification policy. In one or more embodiments of the invention, the second computing device may use the condition of the verification policy to determine whether the signed document is valid based on the verification responses. In one or more embodiments of the invention, the condition specifies that the computing device may determine that the signed document is valid if at least a minimum number of the validity responses confirm validity of the signed document. Alternatively, the computing device may determine that the signed document is valid if the point in time in which the computing device obtains the signed document is within a predetermined period of time after the document was initially signed. Other conditions may be used without departing from the invention.

EXAMPLE

Figure 3A:
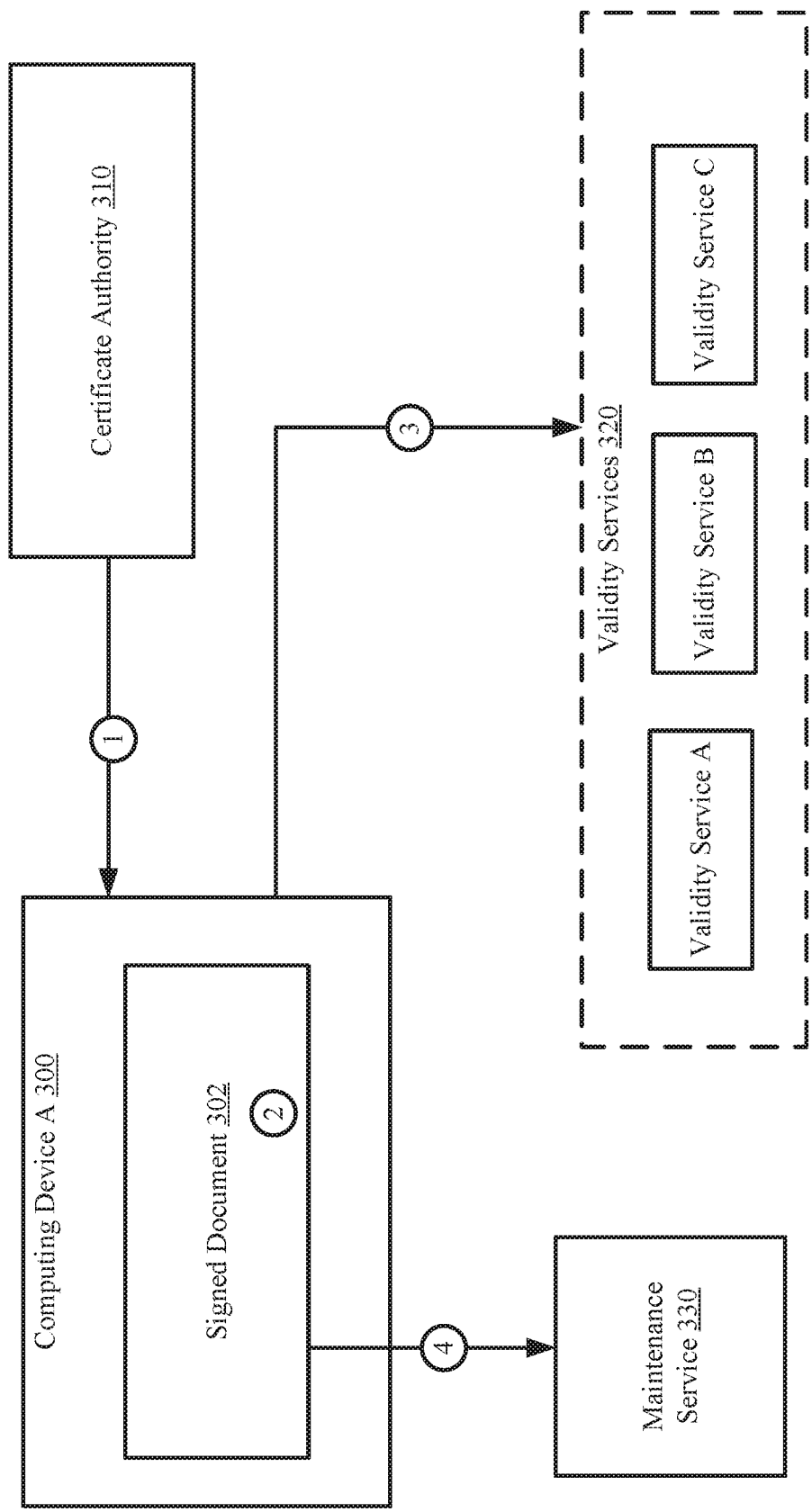
FIGS. 3A-3C show an example in accordance with one or more embodiments of the invention.
Figure 3B:
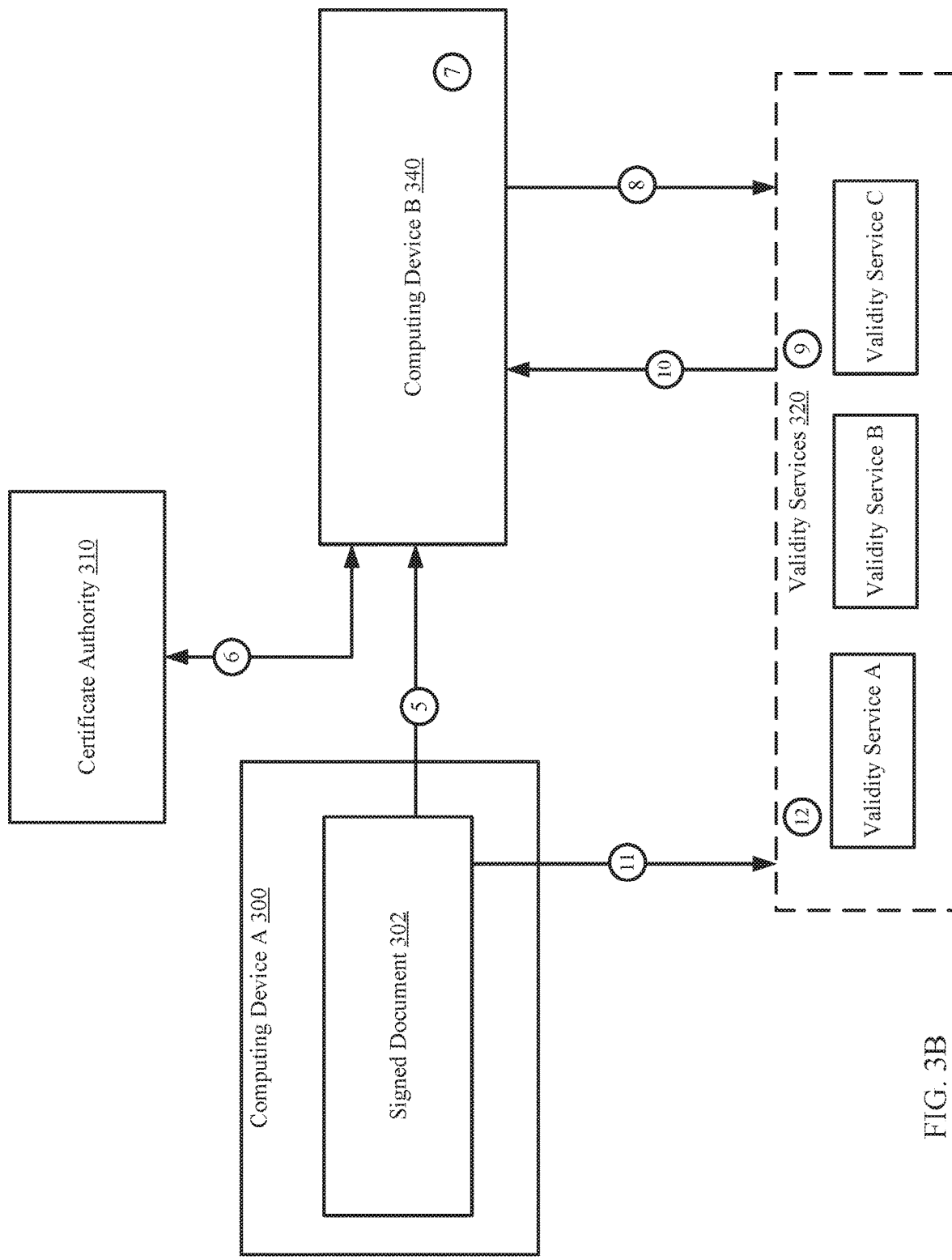
Figure 3C:
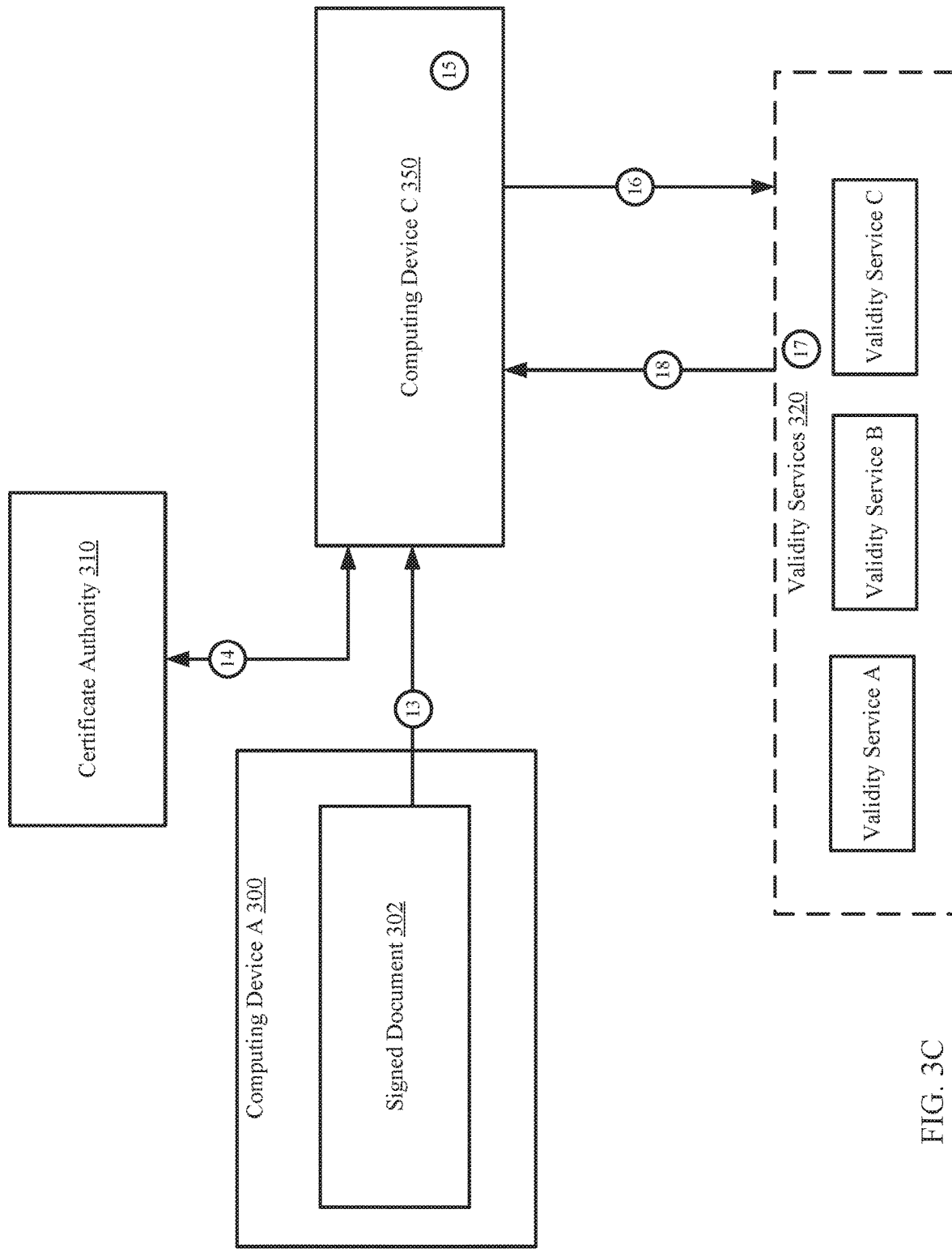

The following section describes an example. The example, illustrated in FIGS. 3A-3C, is not intended to limit the invention. Turning to the example, consider a scenario in which a computing device wants to send a target document to a second computing device.

FIG. 3A shows a diagram of an example system in accordance with one or more embodiments of the invention. The example system includes a first computing device A (300) that is generating a signed document (302) based on the target document. The computing device (300) performs the method of FIG. 2A to generate the signed document. The method includes obtaining a certificate associated with the signed document from a certificate authority (310) [1]. The computing device uses the obtained certificate to generate the signed document (302) [2].

Specifically, the computing device (300) obtains a verification policy that includes using validity services (320) to verify that the signed document is valid. The verification policy specifies that at least two out of the three validity services (320) must determine the signed document is valid in order for a computing device obtaining the signed document (302) to determine that the signed document is valid. Further, the computing device (300) generates a signature based on the verification policy and the target document.

After the computing device (300) generates the signed document (302), the computing device (300) sends a document identifier associated with the signed document (302) to the validity services (320) specified by the verification policy that implement valid lists [3]. The portion of the validity services (320) that implements a valid list updates their respective lists to include the document identifier.

Further, the computing device (300) sends the signed document (302) to a maintenance service (320) [4]. The maintenance service (320) stores the signed document (302) for future access by the computing device (300).

FIG. 3B shows a diagram of the system at a later point in time. At the later point in time, the computing device (300) sends the signed document (302) to a second computing device B (340) [5]. The computing device (340) performs the method of FIG. 2D to determine validity of the document. Specifically, computing device B (340) sends a request to the certificate authority (310) to obtain the certificate associated with the signed document (302) [6]. The computing device B (340) uses a public key of the certificate to verify that the signed document (302) was sent by computing device A (300) [7].

After this is verified, the computing device (340) identifies the validity services (320) specified in the verification policy of the signed document to send a verification request to each of the validity services (320) [8]. The verification requests each specify the document identifier of the signed document (302). Each of the validity services (320) determines validity of the signed document [9]. The validity services (320) each send a verification response based on their respective determinations [10]. The computing device B (340) uses the obtained verification responses, and the verification policy, to determine that the signed document is valid.

At a later point in time, computing device A (300) determines that the signed document is no longer valid. The determination may be based on a user of the computing device identifying that a malicious entity has obtained the private key of the computing device (300). The computing device (300) updates the validity services (320) to revoke the validity of the signed document (302) [11]. A first portion of validity services (320) that implement a valid list removes a document identifier associated with the signed document (302) from the valid list. Conversely, a second portion of validity services (320) that implements a revoked list includes a document identifier associated with the signed document (302) to the revoked list [12].

FIG. 3C shows a diagram of the system at a later point in time. After the computing device (300) has revoked the validity of the signed document (302), the computing device (300) sends the signed document (302) to a computing device C (350) [13]. The computing device C (350) perform the method of FIG. 2D to determine validity of the document. Specifically, computing device C (350) sends a request to the certificate authority (310) to obtain the certificate associated with the signed document (302) [14]. The computing device C (350) uses a public key of the certificate to verify that the signed document (302) was sent by computing device A (300) [15].

After the signed document is verified, the computing device (350) identifies the validity services (320) specified in the verification policy of the signed document to send a verification request to each of the validity services (320) [16]. The verification requests each specify the document identifier of the signed document (302). Each of the validity services (320) determines the validity of the signed document [17]. Because the validity services (320) have been updated to specify a revocation of the signed document (302), the validity services (320) determine that the signed document is not valid. The validity services (320) each send a verification response in accordance with their respective determinations [18]. The computing device B (340) uses the obtained verification responses, and the verification policy, to determine that the signed document is not valid.

END OF EXAMPLE

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412)(e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s)(402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices in a distributed environment. More specifically, embodiments of the invention enable granular signing, distribution signature validation, and distribution revocation of signed documents. This may enable signed documents that are meant to be, by their nature, valid only temporarily to be revoked, thus accurately tracking the validity of signed documents should a user generating the signed document request that the signed document be invalidated. Non-limiting examples of such documents includes an attestation of creditworthiness, an assertion that a document is the latest version of a person's, or that the signed program (which in this context is referred to as (or equivalent to) a document) is believed to be safe to run.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing documents, the method comprising:
    obtaining, from a first computing device, a first signed document, wherein the first signed document comprises a signature and a verification policy, wherein the signature is generated using a certificate, and the certificate is generated by a certificate authority; and
    in response to obtaining the first signed document:
        identifying, by the first computing device and using the verification policy, a first plurality of validity services associated with the signed document, wherein each of the first plurality of validity services is external to and operatively connected to the first computing device, and wherein the first computing device and each of the plurality of validity services are external to the certificate authority;
        sending, by the first computing device, a verification request to the first plurality of validity services, wherein each of the plurality of verification requests specifies the first signed document;
        obtaining, by the first computing device, a plurality of verification responses from the first plurality of validity services; and
        making a determination, by the first computing device and based on the plurality of verification responses, that the first signed document is valid.

2. The method of claim 1; further comprising:
    obtaining, from the first computing device, a second signed document; and
    in response to obtaining the second signed document:
        identifying a second plurality of validity services associated with the second signed document;
        sending a second plurality of verification requests to the second plurality of validity services, wherein each of the second plurality of verification requests specifies the second signed document;
        obtaining a second plurality of verification responses from at least one of the second plurality of validity services, and
        making a second determination, based on the second plurality of verification responses, that the second signed document is valid.

3. The method of claim 2, further comprising:
    obtaining, from a second computing device, a see-end third signed document; and
    in response to obtaining the third signed document:
        identifying the first plurality of validity services associated with the third signed document;
        sending a third plurality of verification requests to the first plurality of validity, services, wherein each of the third plurality of verification requests specifies the third signed document;
        obtaining a third plurality of verification responses from the first plurality of validity services; and
        making a third determination, based on the third plurality of verification responses, that the third signed document is valid.

4. The method of claim 1, wherein the determination is further based on the verification policy, wherein the verification policy specifies a condition.

5. The method of claim 4, wherein the condition specifies a minimum number of responses from a plurality of validity services that are required to validate the signed document.

6. The method of claim 4, wherein the condition specifies a predetermined time period after the signed document was obtained during which responses from validity services are not required to validate the signed document.

7. A method for managing data, the method comprising:
    obtaining, by a computing device, a target document;
    generating, by the computing device and using a certificate, a signature based on the target document and a verification policy, wherein the certificate is generated by a certificate authority, and wherein the verification policy specifies a plurality of validity services, wherein each of the plurality of validity services is external to and operatively connected to the computing device, and wherein the computing device and each of the plurality of validity services are external to the certificate authority; and
    obtaining a signed document using the signature, the target document, and the verification policy.

8. The method of claim 7, further comprising:
    transmitting a document identifier associated with the signed document to at least one of the plurality of validity services that implements a valid list.

9. The method of claim 8, wherein the at least one of the plurality of validity services is specified in the certificate.

10. The method of claim 7, further comprising:
    sending a revocation request specifying a document identifier associated with the signed document to at least one of a plurality of validity services.

11. The method of 7, further comprising:
    transmitting the signed document to a maintenance service.

12. The method of claim 7, wherein the verification policy specifies a condition.

13. The method of claim 12, wherein the condition specifies a minimum number of responses from a plurality of validity services that are required to validate the signed document.

14. The method of claim 12, wherein the condition specifies a predetermined time period after the signed document was obtained during which responses from validity services are not required to validate the signed document.

15. A non-transitory computer readable medium comprising computer readable program code, which when executed by a computer processor enables the computer processor to perform a method, the method comprising:
    obtaining, from a first computing device, a first signed document, wherein the first signed document comprises a signature and a verification policy, wherein the signature is generated using a certificate, and the certificate is generated by a certificate authority; and
    in response to obtaining the first signed document:
        identifying, by the first computing device and using the verification policy, a first plurality of validity services associated with the signed document, wherein each of the first plurality of validity services is external to and operatively, connected to the first computing device, and wherein the first computing device and each of the plurality of validity services are external to the certificate authority;
        sending, by the first computing device, a verification request to the first plurality of validity services, wherein each of the plurality of verification requests specifies the first signed document;

obtaining, by the first computing device, a plurality of verification responses from the first plurality of validity services; and making a determination, by the first computing device and based on the plurality of verification responses, that the first signed document is valid.

16. The non-transitory computer readable medium of claim 15, the method further comprising:

obtaining, from the first computing device, a second signed document; and in response to obtaining the second signed document:
identifying a second plurality of validity services associated with the second signed document;
sending a second plurality of verification requests to the second plurality of validity services, wherein each of the second plurality of verification requests specifies the second signed document;
obtaining a second plurality of verification responses from at least one of the second plurality of validity services; and
making a second determination, based on the second plurality of verification responses, that the second signed document is valid.

17. The non-transitory computer readable medium of claim 16, the method further comprising:

obtaining, from a second computing device, a third signed document; and in response to obtaining the third signed document:
identifying the first plurality of validity services associated with the third signed document;
sending a third plurality of verification requests to the first plurality of validity services, wherein each of the third plurality of verification requests specifies the third signed document;
obtaining a third plurality of verification responses from the first plurality of validity services; and
making a third determination, based on the third plurality of verification responses, that the third signed document is valid.

18. The iron-transitory computer readable medium of claim 15, wherein the determination is further based on the verification policy, and wherein the verification policy specifies a condition.

19. The non-transitory computer readable medium of claim 18, wherein the condition specifies a minimum number of responses from a plurality of validity services that are required to validate the signed document.

20. The non-transitory computer readable medium of claim 18, wherein the condition specifies a predetermined time period after the signed document was obtained during which responses from validity services are not required to valid the signed document.

* * * * *